US009154375B2

(12) United States Patent
Hayter

(10) Patent No.: US 9,154,375 B2
(45) Date of Patent: Oct. 6, 2015

(54) METHOD FOR RECORDING USER EXPERIENCE OR PERFORMANCE OF A PERIPHERAL DEVICE

(75) Inventor: David Paul Hayter, Guildford (GB)

(73) Assignee: Carrier IQ, Inc., Sunnydale, CA (US)

( * ) Notice: Subject to any disclaimer, the term of this patent is extended or adjusted under 35 U.S.C. 154(b) by 0 days.

(21) Appl. No.: 12/638,987

(22) Filed: Dec. 16, 2009

(65) Prior Publication Data

US 2011/0125893 A1 May 26, 2011

Related U.S. Application Data

(60) Provisional application No. 61/263,259, filed on Nov. 20, 2009.

(51) Int. Cl.
G06F 15/173 (2006.01)
H04L 12/24 (2006.01)
H04L 12/26 (2006.01)

(52) U.S. Cl.
CPC ............ *H04L 41/069* (2013.01); *H04L 43/0811* (2013.01)

(58) Field of Classification Search
None
See application file for complete search history.

(56) References Cited

U.S. PATENT DOCUMENTS

| 6,182,143 | B1 | 1/2001 | Hastings | |
|---|---|---|---|---|
| 6,629,134 | B2* | 9/2003 | Hayward et al. | 709/217 |
| 6,785,015 | B1* | 8/2004 | Smith et al. | 358/1.15 |
| 2003/0023720 | A1* | 1/2003 | Wodzianek | 709/224 |
| 2003/0093789 | A1* | 5/2003 | Zimmerman et al. | 725/34 |
| 2003/0145119 | A1* | 7/2003 | Bender et al. | 709/249 |
| 2005/0160167 | A1* | 7/2005 | Cheng et al. | 709/224 |
| 2008/0189412 | A1* | 8/2008 | Wang et al. | 709/224 |

* cited by examiner

Primary Examiner — Brian P Whipple
(74) Attorney, Agent, or Firm — Patentry

(57) ABSTRACT

The present invention comprises a system, apparatus, and method for subscribing to indicia related to a user experience or a peripheral device, in an embodiment a broadband wireless modem, recording selected indicia, and forwarding them to a server on a network. The system comprises a server coupled to a plurality of user terminals through a network, to receive a set of indicia, an apparatus for controlling a baseband/broadband processor, and a program product comprising instructions to adapt a central processing unit to perform as follows. In an embodiment, connecting to a broadband/baseband processor comprising issuing commands, subscribing to receive indicia, determining a condition has occurred, recording a plurality of indicia, forwarding a set of indicia to a destination on the network. Indicia includes measurement values, state changes, event occurrences, user actions, activity and inactivity at time stamped milestones, and sequences and combinations of the above.

19 Claims, 4 Drawing Sheets

METHOD FOR RECORDING USER EXPERIENCE OR PERFORMANCE OF A PERIPHERAL DEVICE

Priority is claimed for this application from 20 Nov. 2009 the filing date of provisional application 61/263,259 which is incorporated by reference in its entirety.

BACKGROUND

Prior art, as disclosed in a related U.S. Pat. No. 7,609,650 issued Oct. 27, 2009, provides for a service quality platform of a data collection and management system to dynamically generate and download to a population of wireless devices rule-based data collection profiles. Profiles define what information is to be recorded on the devices in response to which conditions and events, as well as the conditions and events which enable the device to upload the set of information. Conditions or events comprise selected occurrences in the network or on the device that the device can sense, such as a call dropping or a user pressing a button on the device. Conditions and events also comprise the passage of time, or a request from a network administrator that the device report information back to the server.

Network monitoring solutions are well known in the art and widely employed by service providers, however, previously available solutions can only monitor and diagnose subsets of the overall telecommunications system and therefore have not provided the holistic view of network and device performance desired to efficiently identify and resolve quality issues. Typical approaches to network monitoring include "self-monitoring" wherein a network element reports on its own status and performance and reports any errors that occur during its operation. The resulting operational metrics from a single element can sometimes be indicative of a broader, system-wide problem, but rather than providing answers, problem resolution entails guesswork and extended troubleshooting, which wastes valuable resources and lowers customer confidence. Another common approach includes placing probes at various points in the network to determine if network elements are functioning according to specification. Sometimes referred to as "sniffers", "log monitors" or "event monitors", these monitoring systems are effective at identifying performance issues with a particular network element, but have failed to capture problems that stem from the interfaces among network elements, i.e., these solutions do not address the case where individual elements are performing according to specifications, but problems occur when those elements interact with one another. This far more complex and subtle set of problems has costly consequences to network operators when services cannot be delivered to end customers. Another monitoring approach known in the art involves pre-programmed service monitors, using specific elements to perform service transactions which emulate "real-world" transaction activity; end-to-end performance is then monitored and the results reported. While these solutions catch systematic failures, they cannot detect intermittent or dispersed problems, subtle impairments, or device or end-user specific issues. Further, they can only test anticipated usage scenarios and fail to adapt to new usages and interactions between services. Another mechanism for generating metrics involves integrating the software for creating the metrics with application software that is embedded on or downloaded onto the wireless device; this is in contrast to integrating metric-generating commands with, for example, the operating system software of the wireless device during the device manufacturing process.

BRIEF SUMMARY OF AN EXEMPLARY EMBODIMENT OF THE INVENTION

In an embodiment, the present invention relates to systems and methods which implement a new way to monitor services in a network by utilizing the numerous "end points" or end user devices to capture "real world" usage and performance data across network elements and layers. Because many errors that occur in conjunction with the performance of certain services are only visible from the perspective of the end user's terminal device, the methods of the present invention enable the set of this data which would otherwise be unavailable. In this manner, valuable diagnostic data corresponding to the performance of services within the context of conditions occurring among multiple layers of the network, including the physical layer, the transport layer, and the application layer, can be viewed and analyzed.

In an embodiment the present invention applies to a mobile computing device with higher capacity and battery life than a telecommunication device which simplifies its problem and solutions but also adds new functionality and resources for advantageous improvements.

An exemplary system comprises
a server coupled to a plurality of user terminals through a network, said server adapted to receive a set of indicia,
an apparatus for connecting to a peripheral device, in an embodiment a baseband/broadband processor coupled by a bus to a central processing unit, said apparatus further coupled to a server through a network in an embodiment a wireless network,
a program product comprising instructions to adapt a central processing unit to
  connect to a peripheral device,
  subscribe to a stream of indicia,
  determine that a condition of interest has occurred,
  record indicia related to the condition of interest, and
  forward said recorded indicia to at least one server.
In an embodiment the apparatus comprises
a first circuit for connecting to a broadband/baseband processor,
a second circuit for subscribing to a plurality of streams of indicia,
a third circuit for determining that a condition of interest has occurred,
a fourth circuit for recording a plurality of indicia related to a condition of interest, and
a fifth circuit for forwarding a set of indicia to one or a plurality of servers.

The present claimed invention is a method for operating the apparatus comprising the processes following:
  connecting to a peripheral device in an embodiment a broadband/baseband processor comprising issuing commands,
  subscribing to receive indicia,
  determining a condition has occurred,
  recording a plurality of indicia,
  forwarding a set of indicia to a destination on the network.
These and other aspects of embodiments of the present invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF EMBODIMENTS OF THE INVENTION

Reference will now be made to the drawings to describe various aspects of exemplary embodiments of the invention. It should be understood that the drawings are diagrammatic and schematic representations of such embodiments and, accordingly, are not limiting of the scope of the present invention, nor are the drawings necessarily drawn to scale.

Embodiments of the invention relate to systems and methods for using distributed wireless devices and other network nodes to implement monitoring and data set concerning selected communications network parameters. The recorded data can then be analyzed and data set efforts further focused and refined as suggested by the recorded data and associated trends. The data analyses may be used in connection with, among other things, detecting network impairments and outages, implementation of corrective actions, improving network operations, improvements to customer service, and development of marketing strategies.

Figure 1:
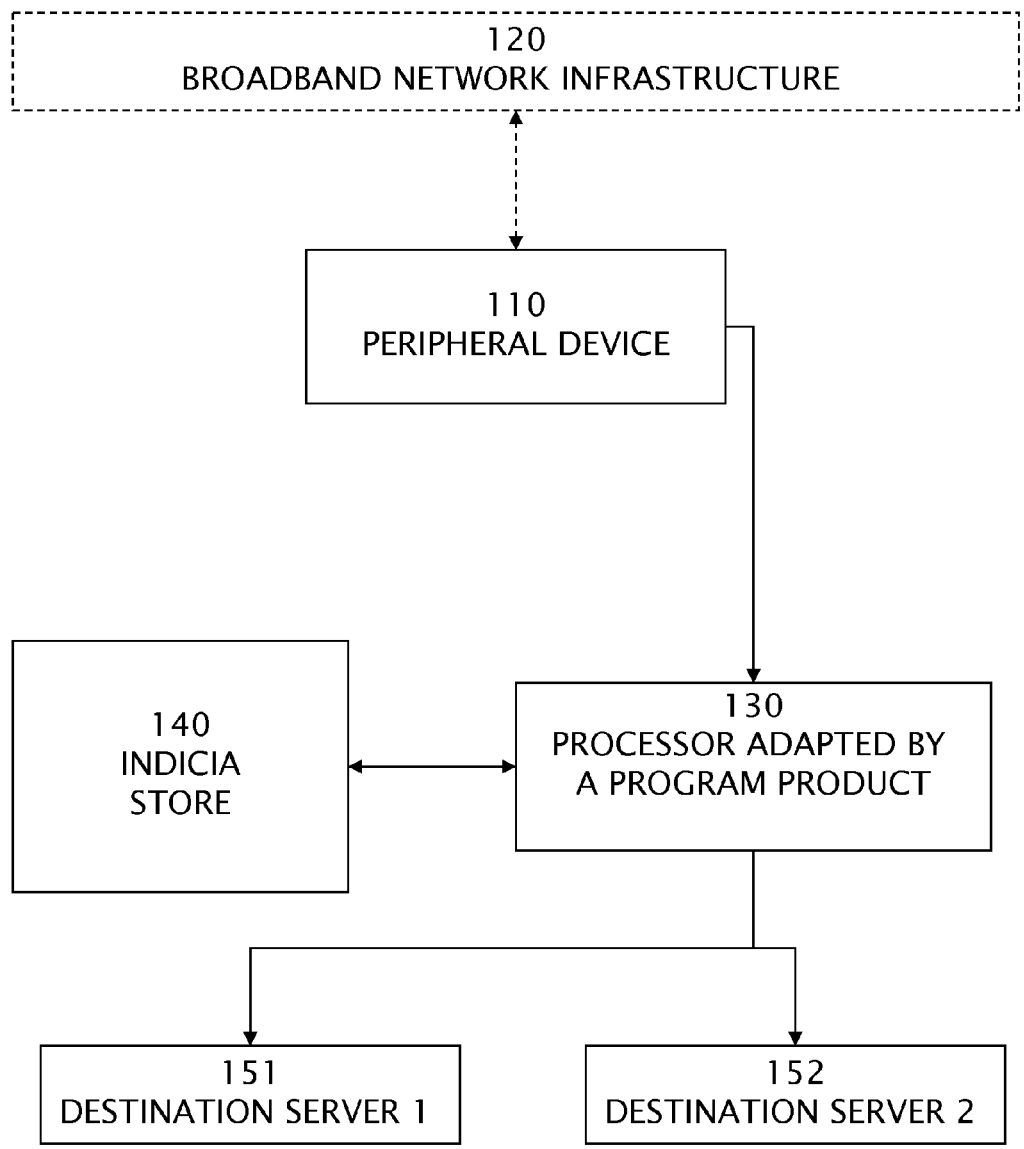
FIG. 1 is a system block diagram.

Referring to FIG. 1, a system block diagram illustrates a non-limiting exemplary system within which the present invention operates comprising
  a plurality of servers 151, 152 coupled to at least one user terminal through a network, said server adapted to receive a set of indicia,
  an apparatus 130 for monitoring a peripheral device 110 such as a baseband/broadband processor communicatively coupled to a broadband network infrastructure 120, said apparatus further coupled to said servers through a wired or wireless network, wherein an apparatus is a processor adapted by a program product comprising instructions to
    connect to a peripheral device,
    subscribe to a stream of indicia,
    determine that a condition of interest has occurred,
    record indicia related to the condition of interest into an indicia store 140, and
    forward said recorded indicia to one or a plurality of servers.

Figure 2:
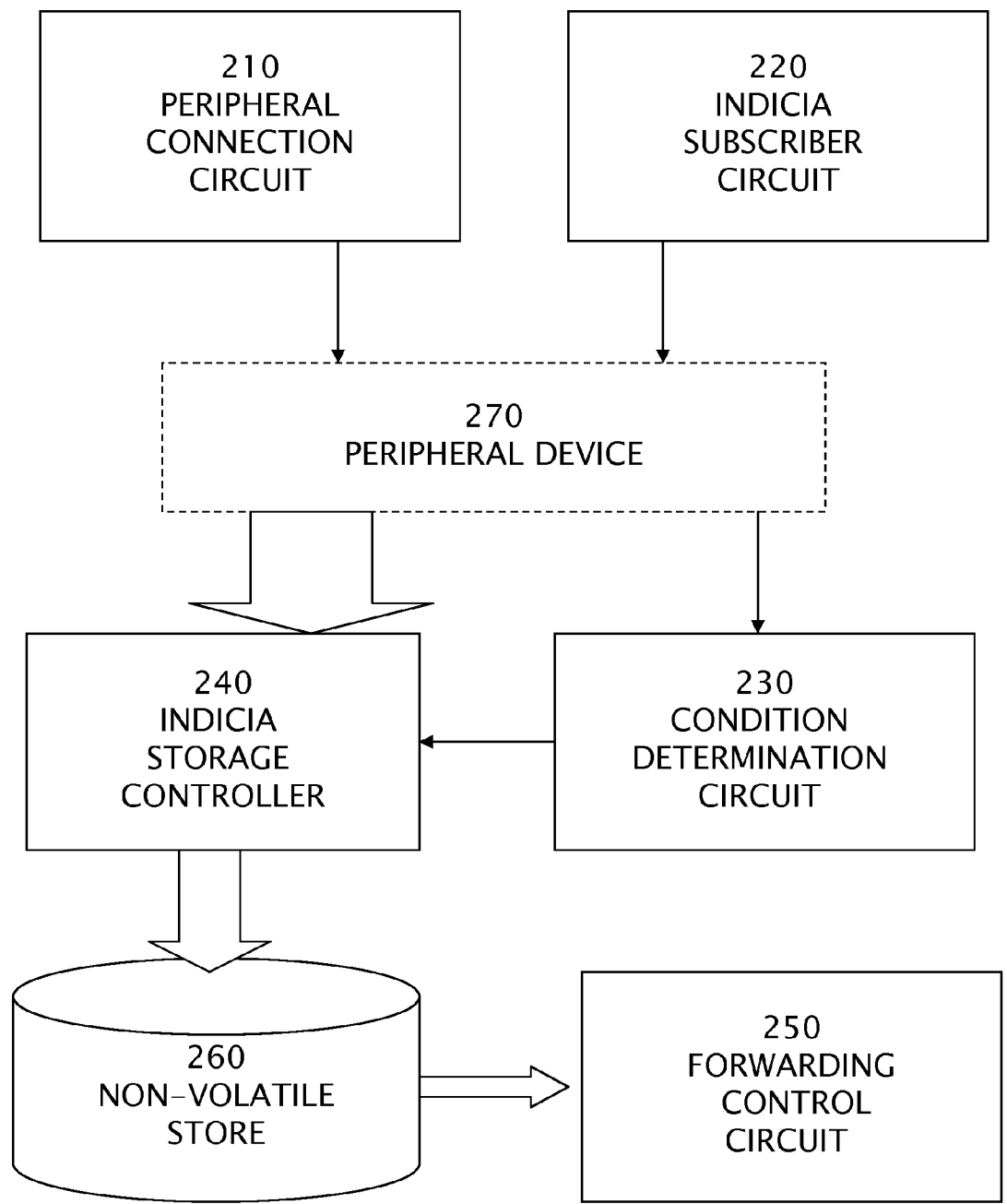
FIG. 2 is a dataflow diagram of an apparatus.

Referring to FIG. 2 an apparatus dataflow diagram, the apparatus comprises
  a first circuit 210 for connection to peripheral device 270,
  a second circuit for subscription to streams of indicia 220,
  a third circuit for determination that and when a condition of interest has occurred 230,
  a fourth circuit for recordation of a plurality of indicia related to a condition of interest 240 into a store 260, and
  a fifth circuit for transmission of (i.e., forwarding) a set of indicia to a server 250.

It is generally known that a circuit may be embodied as a processor under software control, the processor adapted by instructions, said processors suitable for the execution of a computer program include, by way of example, embedded core processors such as ARM, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The first circuit for connecting to a peripheral device may be a processor adapted to control or communicate with a broadband modem.

The second circuit for subscribing to a plurality of streams of indicia may be embodied in a processor adapted to issue commands.

The third circuit for determining that a condition of interest has occurred may be a processor adapted by a program to record certain values and codes into a plurality of buffers and trigger on any combination of states, values, codes, changes, rates of change, or events.

The fourth circuit for recording a plurality of indicia related to a condition of interest comprises a processor to store piecewise structured logs of events and measurements into non-volatile store. The processor is adapted to store a time-based record of conditions, status codes, measurement values, and user states based on some criteria that the data will be of interest and ignore a voluminous amount of indicia streaming out of the peripheral device or in the system bus. Hardware and software configuration of the system may be needed to analyze a customer situation.

The fifth circuit for forwarding a set of indicia to a server has at least one destination for each connection. The circuit implements a protocol in an embodiment a user datagram protocol transaction. In another embodiment, hypertext transfer protocol (http) transactions; in another embodiment secure http POST transactions. Another exemplary embodiment comprises a Short Messaging Service (SMS) protocol. Another exemplary embodiment comprises OMA-DN protocol.

The transmission circuit may use a cellular data network, a wireless 802.11a/b/g/n network, a wired Ethernet network, or all of the above according to a preference. The transmission circuit has any option of wired or wireless data communication.

Figure 3:
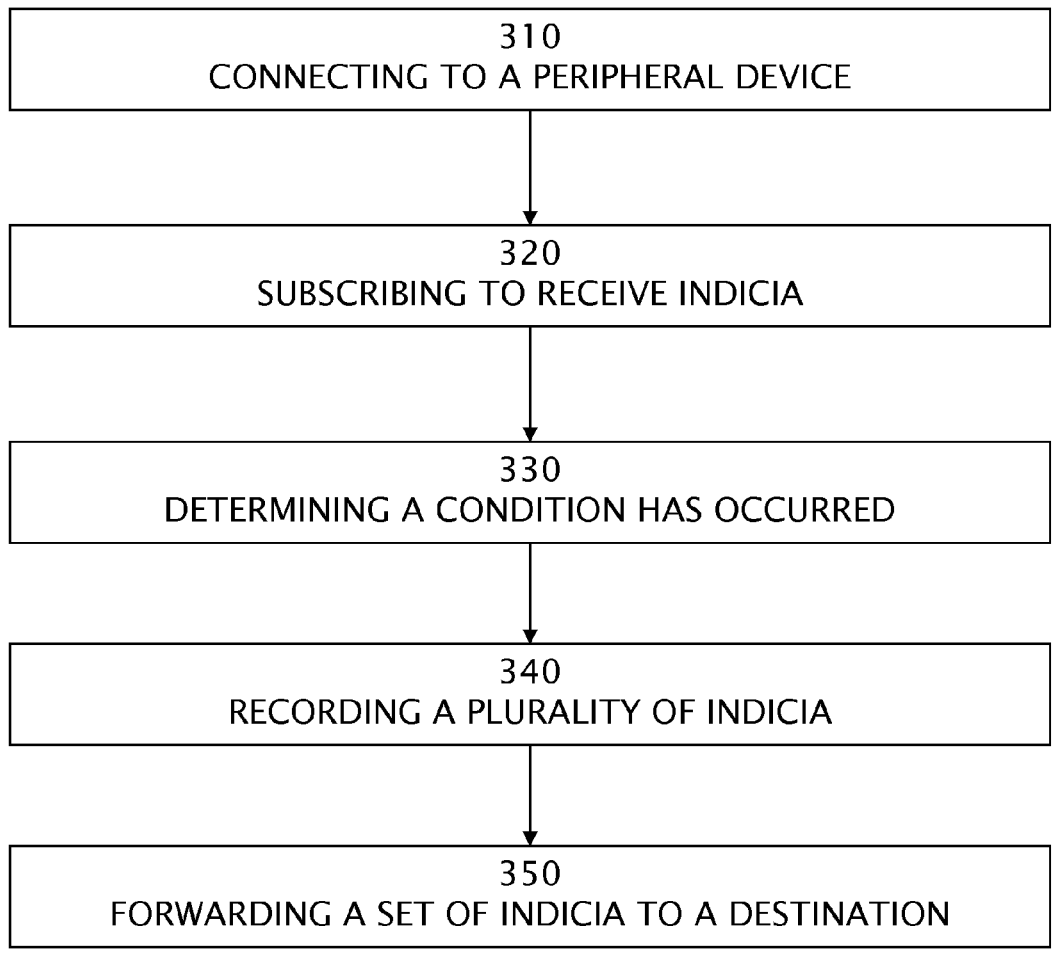
FIG. 3 is a flowchart of a method.

Referring to FIG. 3 a flowchart of a method for operating the apparatus comprising the processes following:
  connecting to a peripheral device 310,
  subscribing to receive indicia 320,
  determining a condition has occurred 330,
  recording a plurality of indicia 340, and
  forwarding a set of indicia to a destination on the network 350.

In an embodiment a peripheral device is a broadband modem such as but not limited to a wireless baseband processor.

In an embodiment connecting to a broadband/baseband processor includes opening a port to the processor, configuring the processor to stream data, subscribing to certain indicia, and monitoring output on a port.

In an embodiment connecting to a broadband/baseband processor further comprises sensing the presence of said processor in the system, issuing commands to control a connection, in an embodiment including but not limited to AT commands.

Subscribing to receive indicia comprise the following non-limiting exemplary list of indicia for exemplary broadband/baseband modems for CDMA, for GSM/UMTS, and for their equivalents in GPRS/EDGE (i.e. RLC Statistics and RF Measurements):

Within CDMA:

1) CDMA ACCESS CHANNEL—Log stream containing the CDMA layer 3 messages on the access channel. Will show network acquisition procedures executed.

2) REVERSE TRAFFIC CHANNEL—Log stream containing the CDMA layer 3 messages on the uplink traffic channel. Will show network procedures executed during a data call.

3) FORWARD TRAFFIC CHANNEL—Log stream containing the CDMA layer 3 messages on the downlink traffic channel. Will show the network procedures executed during a data call.

4) RLP STATISTICS—Log stream containing the RLP (Radio Link Protocol) statistics such as number of transmitted frames, number of idle frames, number of retransmitted frames, number of transmitted idle frames, etc.

5) ACCESS ATTEMPT—Log stream containing access probe sequence information such as time to complete the access attempt, number of successful/failed attempts.

6) RLC STATISTICS DOWNLINK PPP—Log stream that holds the PPP packets (embedded are the IP packets) received from the base station. Used to calculate throughput, get IP negotiation/authentication events, during the data call.

7) RLC STATISTICS UPLINK PPP—Log stream that holds the PPP packets (embedded are the IP packets) transmitted to the base station. Used to calculate throughput, get IP negotiation/authentication events, during the data call.

Within GSM/UMTS:

8) UMTS NAS SIGNALING MESSAGES—Log stream containing the Layer 3 messages common for GSM and UMTS. Used to determine when the PDP context was activated/deactivated, network registration procedures executed.

9) GSM SIGNALING MESSAGES—Log stream containing the GSM Layer 3 messages. Will show the network procedures executed by the device/network.

10) RRC SIGNALING MESSAGES—Log stream containing GSM RRC signaling messages. Will show the network procedures executed by the device/network.

11) RLC UPLINK STATISTICS—Log stream containing statistics about the RLC (Radio Link Control) transport such as number of frames transmitted, number of re-transmissions, etc, during a data call.

12) RLC DOWNLINK STATISTICS—Log stream containing statistics about the RLC (Radio Link Control) transport such as number of frames received, number of receive errors, etc, during a data call.

13) ACTIVE CELLS—Log stream containing the current active cells measured by device. Info includes the scrambling codes and active set count. Together with neighbor sets, used to estimate location of device and RF measurements.

14) NEIGHBOR CELLS—Log stream containing the current neighboring cells that can be measured or seen by device. Info includes the scrambling codes and neighbor set counts. Together with active sets, used to estimate location of device and RF measurements.

15) ALL CELLS Log stream containing the measurements of all the cells seen and measured. The RSCP/ECIO are derived from the data contained in this log(e.g., coherent/non-coherent integration, searcher energy). Together with the active and neighbor sets, used to estimate location of device and RF measurements.

Determining a condition comprises the following non-limiting exemplary list:
an event such as a connection lost,
a data value passing a low threshold or a high threshold,
two data values meeting an equality or inequality condition,
a single state transition or series of state transitions,
a period of time without changing value or state,
a rate of change of a data value,
a threshold of filled storage,
a failure to respond to a command,
a location within an area, and
a user initiated process.

In an embodiment, a condition is defined as a programmable combination of events, status codes, measured values, and elapsed times.

Recording a plurality of indicia comprises writing to a memory location, storing in volatile or non-volatile storage, aggregating the number of events, determining a signature. Indicia include measurement values, time-stamps of events, event codes, status codes, activity or non-activity, a sequence of events or conditions, user selections, and sensory data. Indicia include pressure, acceleration, temperature, orientation, location, illumination, sounds, and electro-magnetic fields.

Forwarding a set of indicia to a destination on the network can be done on a schedule, on a poll, on a self initiated trigger. More than one destination may receive different sets. Transmission may be delayed until connectivity and traffic allow. Transmission may be encrypted. Transmission may be accomplished via any network connection. In an embodiment transmission is done over a wireless modem. In an embodiment transmission is done by an embedded wireless modem in at least one of the following a netbook, a laptop computer, a vehicle dashboard, a game controller, and a pair of virtual reality goggles.

In an embodiment a peripheral can be modems and non-modems. Some modems support protocols or standards such as the following exemplary list of wireless broadband communications standards:

CDMA
  a. 1×RTT
  b. EvDO/EvDO rev A.
GSM/UMTS
  a. GSM
  b. GPRS
  c. EDGE
  d. UMTS
  e. HSPA comprising HSDPA and HSUPA,
LTE
WiMAX
WiFi, and
any digital cellular transceiver.

Other peripherals include sensors and controllers, actuators, cameras, sound, and light.

In an embodiment a user terminal comprises
an electronic book,
a game station,
a laptop computer,
a notebook computer,
a smart phone, a netbook,
a tablet computer,
a TV/movie/music player,
a game station,
virtual reality goggles,
a mobile data display, and
a vehicle remote monitor or control.

Figure 4:
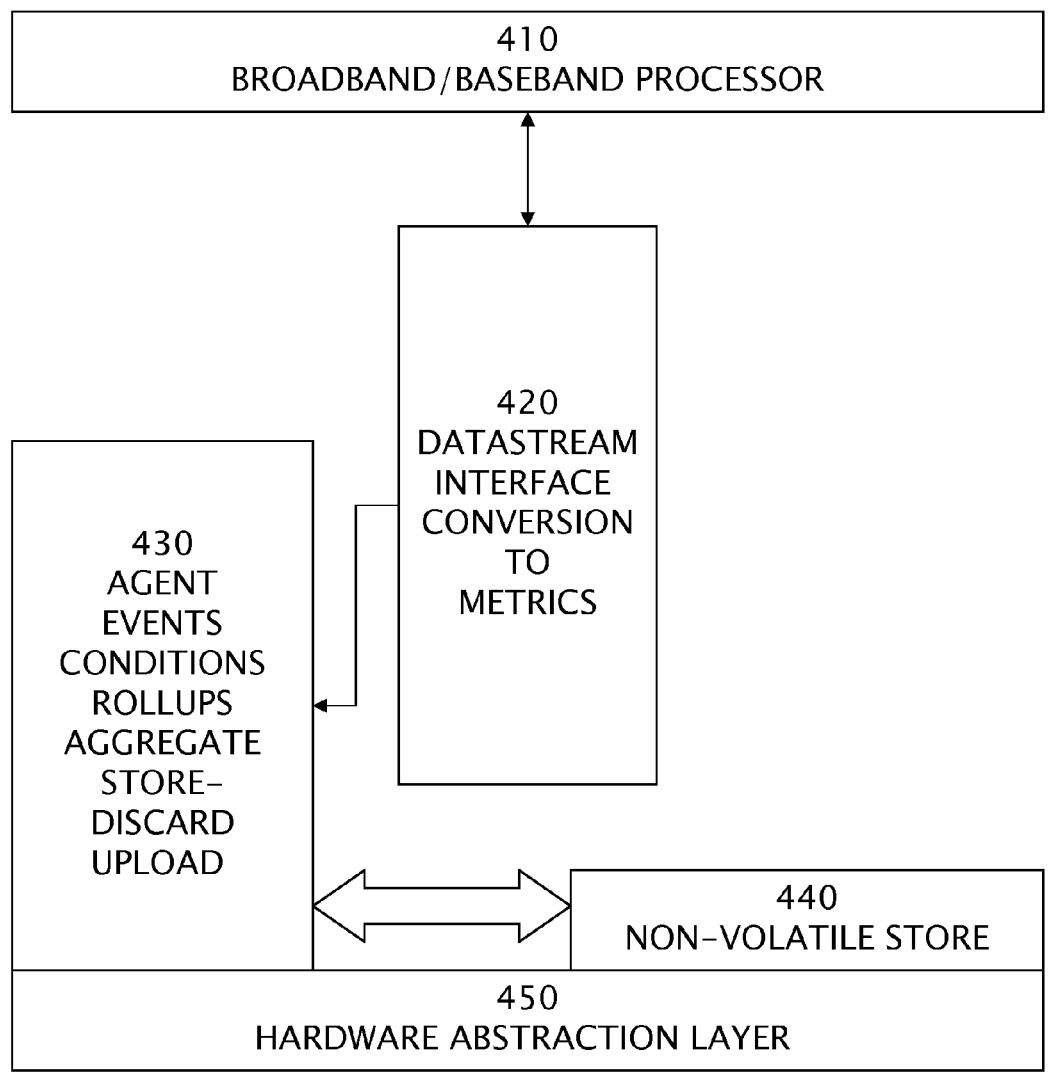
FIG. 4 is a schematic of a preferred embodiment.

In a preferred embodiment, illustrated in FIG. 4, the invention comprises an agent 430, communicatively coupled to a hardware abstraction layer 450, the agent further coupled to a data stream interface and conversion layer 420. The agent comprises a program product as disclosed in U.S. Pat. No. 7,609,650 comprising a method comprising receiving a profile, executing said profile, determining a condition has occurred, recording indicia related to said condition, transforming the indicia to a package of metrics, and forwarding said package to a destination specified by the profile and on a schedule specified by the profile. The hardware abstraction layer provides an interface all of the services available through the operating system including but not limited to standard input and outputs, volatile and non-volatile storage 440 of a computer, time, hardware status, active applications and processes. The data stream interface sends configuration commands to a peripheral device in this embodiment a broadband baseband processor 410 via a cardbus or universal serial bus and receives a data stream of selected indicia to which it has subscribed. In an embodiment the invention further comprises a command circuit to send commands to and receive replies from the broadband/baseband processor. In an embodiment commands are not limited to AT standard commands, ad hoc extension commands, and de facto standard commands.

The present invention is further comprised of a PC information circuit which observes user interactions, user keystrokes, system state, operating system versions, memory usage, storage usage, processor usage, applications running, system services active, and other customer care parameters. Such a circuit may be implemented in software as a service, or daemon.

CONCLUSION

The present invention is distinguished from conventional baseband/broadband measuring methods by
  recording indicia upon a user's device or equipment,
  determining that a condition of interest has occurred,
  forwarding a set of indicia to a destination on the network without conflicting with other traffic or the user's utilization of the channel, and
  subscribing to a stream of selected indicia over a peripheral interface.

Conventional measuring approaches may record from the network's infrastructure and succeed on the condition that the user's device or equipment are in range, functioning correctly, and have sufficient signal strength. Customer care situations arise when the user's equipment is poorly connected, possibly due to circumstances like interference in the channel, not seen by the network infrastructure. Conventional measuring approaches may record everything at the user's device or equipment in large capacity storage. This would result in large overhead for the user either in uploading voluminous data or analyzing it to determine when or if a problem occurred, impacting the performance of the equipment at all times even when unneeded. Conventional measuring approaches may attempt to upload information in real time as it occurs. But interference or poor environment reduces available bandwidth and consuming part of it for uploading measurements aggravates the customer care effect. In particular, several audiences are potentially interested in determining if their part of the system is the root cause and they may be competitors. Thus an application service provider, a network service provider, a hardware original equipment manufacturer (oem), and a software vendor may each require indicia independently of a proprietary nature. Conventional solutions do not direct the forwarding of indicia to a plurality of recipients.

As is well known in the art, the techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

A number of embodiments of the invention have been described. Nevertheless, it will be understood that various modifications may be made without departing from the spirit and scope of the invention. For example, Wireless and Wired Communication Devices, Electronic Books, Games, and Computing Environments are non-limiting exemplary embodiments. As indicated herein, embodiments of the present invention may be implemented in connection with a special purpose or general purpose telecommunications device, including wireless and wireline telephones, other wireless communication devices, or special purpose or general purpose computers that are adapted to have comparable telecommunications capabilities. Embodiments within the scope of the present invention also include computer-readable media for carrying or having computer-executable instructions or electronic content structures stored thereon, and these terms are defined to extend to any such media or instructions that are used with telecommunications devices.

By way of example such computer-readable media can comprise RAM, ROM, flash memory, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. An end user terminal apparatus for detecting network impairments and outages which comprises:
   a first circuit for connection to a wireless baseband processor;
   a second circuit for subscription to streams of indicia concerning selected communications network parameters emitted from said wireless baseband processor;
   a third circuit for determination that and when a condition of interest has occurred triggered by a combination of values, codes, changes, rates of change, or events which impair LTE network operations;
   a fourth circuit for recordation of a plurality of indicia wherein said fourth circuit for recordation comprises a processor adapted by a rule-based data collection profile to store piecewise structured logs of a time-based record of conditions occurring among multiple layers of the network including the physical layer, the transport layer and the application layer, and measurement values into a store when said condition of interest has occurred; and
   a fifth circuit for forwarding a set of indicia to a server, the circuits mutually coupled communicatively.

2. The apparatus of claim 1 wherein indicia comprise: Radio Link Protocol statistics.

3. The apparatus of claim 1 wherein indicia comprise: log stream containing access probe sequence information.

4. The apparatus of claim 1 wherein indicia comprise: log stream that holds uplink and downlink PPP packets (embedded IP packets) received from a base station.

5. The apparatus of claim 1 wherein indicia comprise: log stream containing GSM RRC signaling messages.

6. The apparatus of claim 1 wherein indicia comprise: log stream containing uplink and downlink statistics about Radio Link Control transport.

7. The apparatus of claim 1 wherein indicia comprise: log stream containing any current active cells measured by said wireless baseband processor.

8. The apparatus of claim 1 wherein indicia comprise: log stream containing any current neighboring cells that can be measured or seen by said wireless baseband processor.

9. The apparatus of claim 1 wherein indicia comprise: log stream containing any measurements of all cells seen and measured.

10. The apparatus of claim 1 wherein a condition of interest comprises: a connection lost.

11. The apparatus of claim 1 wherein a condition of interest comprises: a data value passing a low threshold or a high threshold.

12. The apparatus of claim 1 wherein a condition of interest comprises: a plurality of data values meeting an equality or inequality condition.

13. The apparatus of claim 1 wherein a condition of interest comprises: a period of time without changing value.

14. The apparatus of claim 1 wherein a condition of interest comprises: a rate of change of a data value.

15. The apparatus of claim 1 wherein a condition of interest comprises: a threshold of filled storage.

16. The apparatus of claim 1 wherein a condition of interest comprises: a failure to respond to a command.

17. The apparatus of claim 1 wherein a condition of interest comprises: a location within an area.

18. The apparatus of claim 1 wherein a condition of interest comprises: a user initiated process.

19. The apparatus of claim 1 wherein a condition of interest comprises: a programmable combination of events, measured values, and elapsed times.

* * * * *